United States Patent
Egle et al.

(10) Patent No.: US 6,449,220 B1
(45) Date of Patent: Sep. 10, 2002

(54) NETWORK SUBSCRIBER STATION HAVING A FEATURE THAT PREVENTS INACCURACIES IN TIME MESSAGES

(75) Inventors: Fridolin Egle, Durmersheim; Christoph Muench, Eggenstein, both of (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/849,349

(22) Filed: May 7, 2001

Related U.S. Application Data

(63) Continuation of application No. PCT/DE99/03443, filed on Oct. 28, 1999.

(30) Foreign Application Priority Data

Nov. 5, 1998 (DE) .................. 298 19 806 U

(51) Int. Cl.$^7$ .................. G04C 11/00; G04C 11/02; H04L 7/00
(52) U.S. Cl. .................. 368/46; 368/47; 340/825.21; 375/354
(58) Field of Search .................. 368/10, 46–47; 340/825.21, 825.44, 825.54; 375/354–359; 455/68, 70, 13.2

(56) References Cited

U.S. PATENT DOCUMENTS

| | | | | |
|---|---|---|---|---|
| 4,337,463 A | * | 6/1982 | Vangen | 340/825.3 |
| 5,276,659 A | | 1/1994 | Kotaki | 368/10 |
| 5,774,057 A | * | 6/1998 | Kalbermatter | 340/825.21 |
| 6,236,623 B1 | * | 5/2001 | Read et al. | 368/46 |

FOREIGN PATENT DOCUMENTS

| | | | | |
|---|---|---|---|---|
| DE | 36 38 947 | | 5/1988 | G06F/15/16 |
| DE | 43 20 137 | | 12/1993 | G04C/11/04 |
| EP | 0 548 381 | | 6/1993 | G06F/1/14 |
| EP | 0 613 271 | | 8/1994 | H04L/12/40 |
| WO | 96/27822 | | 9/1996 | G04G/7/02 |

OTHER PUBLICATIONS

Siemens Catalog ST 70, chapter 12, 1997 edition.

* cited by examiner

*Primary Examiner*—Vit Miska
(74) *Attorney, Agent, or Firm*—Sughrue Mion, PLLC

(57) ABSTRACT

A network user station (2), which in a transmitting mode transmits telegrams (5) to another network user station (2) and in a receiving mode receives telegrams (5) from another network user station. Said telegrams contain messages of identical message length in a message string. One of said messages is a time message (5d) provided with a time of day. The network user station is provided with means (11; 13) for substantially preventing inaccuracies with respect to a transmittal and/or processing instant of the time of day.

12 Claims, 3 Drawing Sheets

NETWORK SUBSCRIBER STATION HAVING A FEATURE THAT PREVENTS INACCURACIES IN TIME MESSAGES

This is a Continuation of International Application PCT/DE99/03443, with an international filing date of Oct. 28, 1999, which was published under PCT Article 21(2) in German, and the complete disclosure of which is incorporated into this application by reference.

FIELD OF AND BACKGROUND OF THE INVENTION

The invention relates to a network user station, which can be connected with another network user station and which, in a transmitting mode, transmits telegrams to the other network user station and in a receiving mode receives telegrams from the other network user station. These telegrams contain messages of identical message length in a message string. One of these messages is a time message provided with a time of day.

Such a network user station is known from the Siemens catalog ST 70, chapter 12, 1997 edition. This network user station is suitable for use in a distributed automation system including a plurality of automation components, which must be synchronized for controlling a technical process in accordance with an automation task. To this end, a time transmitter connected to the network cyclically transmits via broadcasting or multicasting a time message which forms part of a message string comprising a plurality of messages. The automation components use this transmitted time message to synchronize their clocks. Due to different dwell times of a time message in the transmitter and/or receiver of the network user station, it can occur that the times stored in the time message are erroneous with respect to the transmittal and/or receive time in the transmitting and/or receiving mode.

OBJECTS OF THE INVENTION

One object of the invention is thus to create a network user station of the initially mentioned type which substantially prevents inaccuracies with respect to a transmittal and/or processing instant of the time of day.

SUMMARY OF THE INVENTION

This and other objects are solved providing an algorithm and/or a component, which in transmitting mode records a first delay time between the instant when the time message is input in the message string and the instant when transmission of the time message begins, and which adjusts the time of the time message corresponding to this recorded first delay time.

The messages in the message string are processed in the sequence in which they are deposited in said message string. An underlying idea of the invention is to detect the time delay that is caused by a delayed processing of the time message within the message string and accordingly to correct the time stored in the time message. If the network user station operates in a transmitting mode, the algorithm/component of the network user station detects a first delay time between the instant when the time message is entered in the message string and the instant when transmission of the time message starts and adjusts the time stored in the time message based on this detected first delay time. If the network user station operates in a receiving mode, the algorithm/component detects a second delay time between the instant when the time message is received and the instant when the time message is processed and adjusts the time stored in the time message based on this detected second delay time.

This ensures that the time stored in the time message is the correct time of day at the transmitting instant of the time message. It further ensures that the time to be processed in the receiver is the correct time of day at the processing instant.

In preferred embodiments of the invention, the algorithm/component in the transmitting mode provides the time message to be transmitted with an identification code. In a receiving mode the algorithm/component analyzes the code, which indicates to a network user station operating in receiving mode whether the time stored in the time message has been adjusted. This makes it possible for the receiving network user station to introduce corresponding measures, e.g., in such a way that a non-adjusted time of a time message is not further processed.

BRIEF DESCRIPTION OF THE DRAWINGS

The invention as well as embodiments and advantages thereof are described below in greater detail, by way of example, with reference to the drawings in which.

DETAILED DESCRIPTION OF THE PREFERRED EMBODIMENTS

Figure 1:
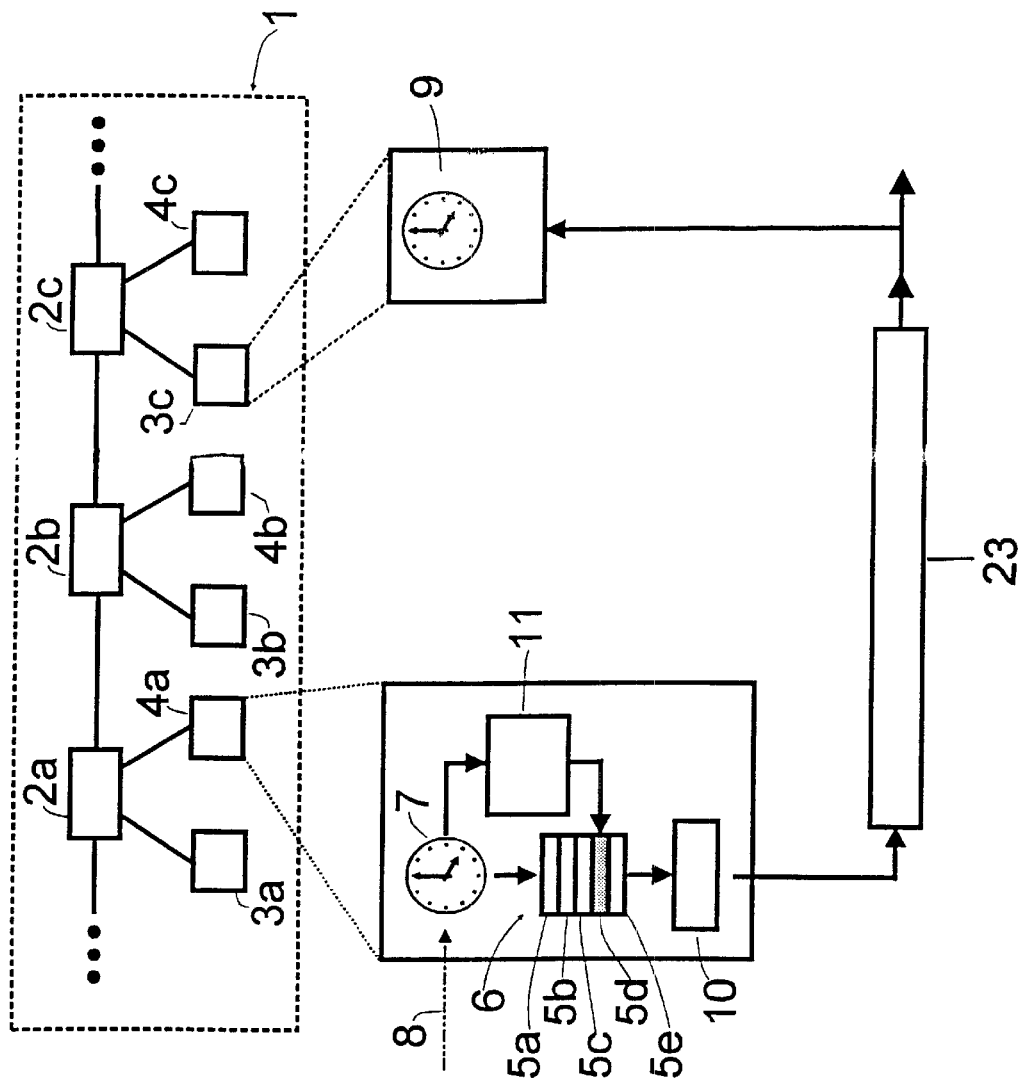
FIG. 1 is a schematic diagram of a preferred embodiment of the network of the present invention showing time adjustment by the transmitting unit.

In FIG. 1, reference numeral 1 identifies a network, e.g., a local area network (LAN). A plurality of network user stations 2a, 2b, 2c, . . . is connected to the network 1, each of which has a receiver 3a, 3b, 3c, . . . and a transmitter 4a, 4b, 4c, . . . . . The present example assumes that the transmitter 4a of the network user station 2a is to transmit to receiver 3c of network user station 2c messages 5a, 5b, 5c, 5d, 5e in a message string 6, via a network connection 23. Message 5d is a time message. The time message 5d contains the time of day of a timer 7 of the network user station 2a, which can be externally synchronized by a signal 8. A timer 9 of network user station 2c must be synchronized with the time of day entered in time message 5d at an input instant. Due to the fact that a network controller 10 of the transmitter 4a transmits messages 5a, 5b, 5c, 5d, 5e to receiver 3c in the time sequence in which they were deposited in the message string 6, the time entered in the time message 5d deviates from the actual time of day at the instant when transmission begins. In the present example, five processing cycles pass between the moment when the time of day is entered in time message 5d and the moment when this time message 5d is transmitted to the receiver 3c by the network controller 10. As a result, the time stored in time message 5d must be corrected by this delay time of five processing cycles. It is assumed that for each processing cycle the network controller 10 transmits a message 5a, 5b, to the receiver 3c. The delay time is recorded and the time of day is adjusted according to the delay time by a recording and adjusting unit 11 of the transmitter 4a. The time of day is supplied to the unit 11 at the moment when the time is entered in the time message 5d. First, the unit 11 records the delay time in the form of the number of processing cycles up to the instant when the time message 5d is transmitted and finally adjusts the time of day in the time message 5d according to the delay time.

Figure 2:
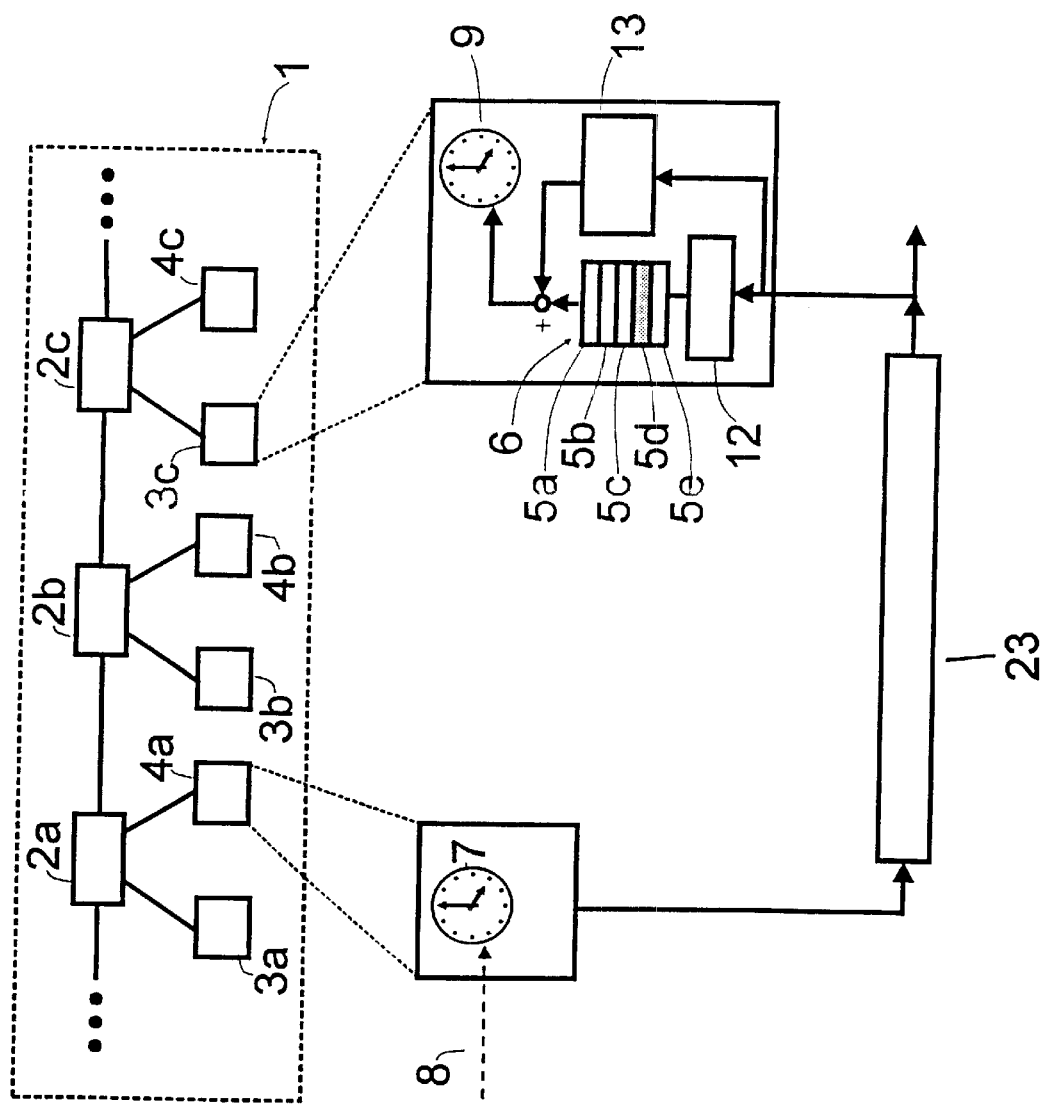
FIG. 2 is a schematic diagram of another embodiment of the network user station of the present invention showing time adjustment by the receiving unit.

FIG. 2, which depicts another schematic diagram of a network, will now be described. The parts that are identical in FIGS. 1 and 2 are provided with identical reference numbers. Transmitter 4a of user station 2a transmits messages 5a, . . . of message string 6 to a network controller 12 and a recording and adjusting unit 13 of the receiver 3c of the user station 2c via a network connection 23. This recording and adjusting unit 13 decodes messages 5a, 5b, . . . , detects the time message and records the number of processing cycles required between the instant when time message 5d is received and the instant when time message 5d is forwarded to the timer 9. According to this number of processing cycles, the unit 13 adjusts the time of day and enters this corrected time in time message 5d, so that a correct time of day is supplied to timer 9 for its synchronization.

Figure 3:
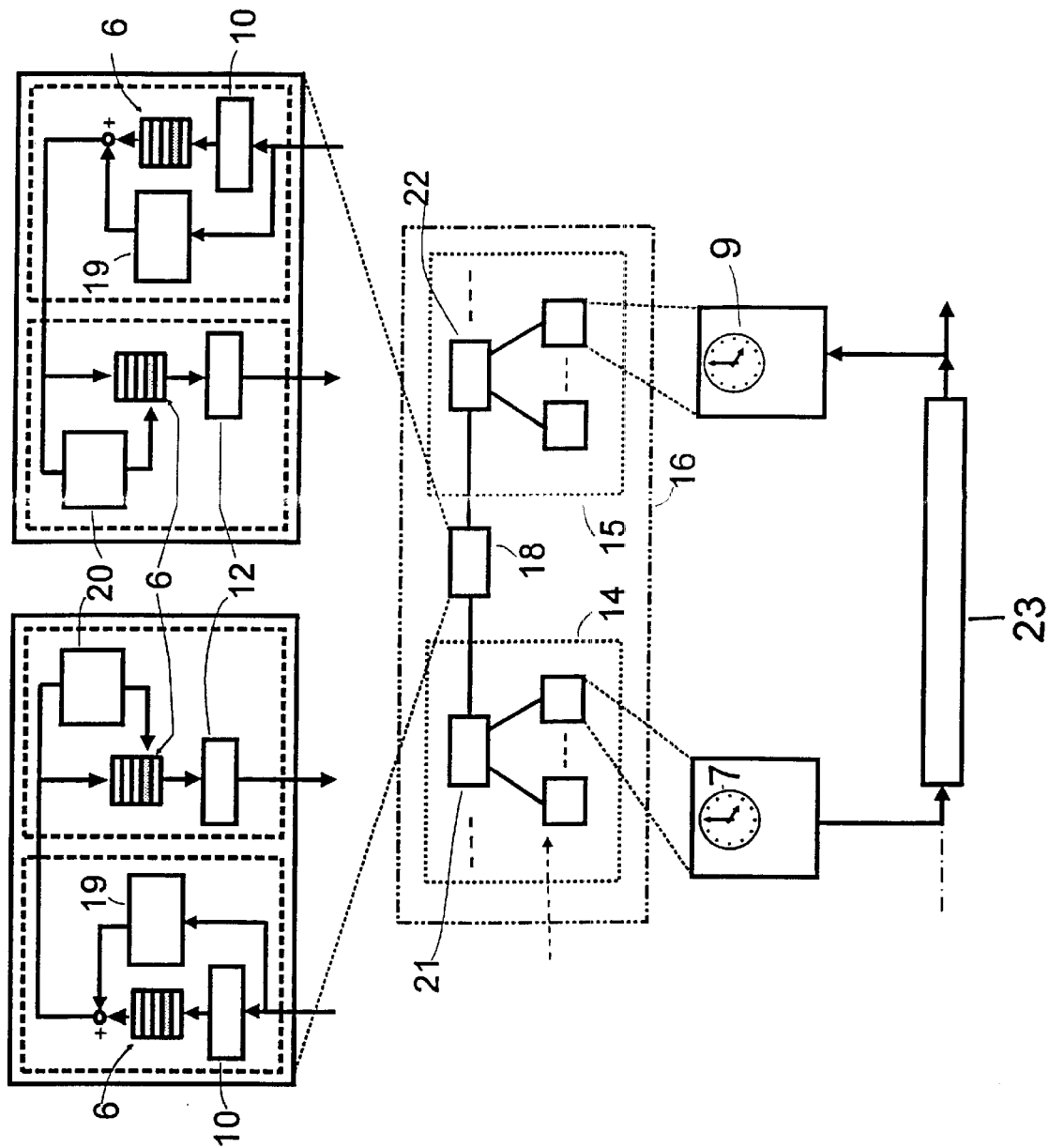
FIG. 3 is a schematic diagram of an integrated network of the present invention showing a network junction connecting multiple networks.

FIG. 3 shows an integrated network 16 formed of two networks 14, 15. A network user station 18, e.g., a network user station in the form of a gateway, a router, a relay, or a bridge, forms the network junction and provides the connection between the two networks 14, 15. This network user station 18 has recording and adjusting units 19, 20. If a user station 21 of the network 14 transmits a time message to user station 22 of network 15, recording and adjusting unit 19 adjusts the time to be received from user station 21 and the recording and adjusting unit 20 adjusts the time in the time message to be transmitted to user station 22. If the user station 22 of network 15 transmits a time message to the user station 21 of network 14, the recording and adjusting unit 19 adjusts the time of day to be received from user 22 and recording and adjusting unit 20 adjusts the time in the time message to be transmitted to user station 21.

The above description of the preferred embodiments has been given by way of example. From the disclosure given, those skilled in the art will not only understand the present invention and its attendant advantages, but will also find apparent various changes and modifications to the structures and methods disclosed. It is sought, therefore, to cover all such changes and modifications as fall within the spirit and scope of the invention, as defined by the appended claims, and equivalents thereof.

What is claimed is:

1. A network user station connected with another network user station, wherein, in a transmitting mode, the network user station transmits telegrams to the other network user station and, in a receiving mode, the network user station receives telegrams from the other network user station, wherein the telegrams contain messages of identical message length in a message string of which one message is a time message provided with a time of day, and wherein the network user station is provided with means, which, in the transmitting mode, record a delay time between the instant when the time message is input in the message string and the instant when transmission of the time message begins, and which adjust the time of the time message corresponding to the recorded delay time.

2. The network user station of claim 1, wherein the network user station is provided with further means, which, in the receiving mode, record a second delay time between the instant when the time message is received and the instant when the time message is processed, and which adjust the time of the time message corresponding to the recorded second time delay.

3. The network user station of claim 1, wherein the means, in the transmitting mode, provide the time message to be transmitted with an identification code indicating to a network user station that operates in receiving mode whether the time stored in the time message has been adjusted.

4. The network user station of claim 2, wherein the means, in the transmitting mode, provide the time message to be transmitted with an identification code indicating to a network user station that operates in receiving mode whether the time stored in the time message has been adjusted.

5. The network user station of claim 3, wherein further means, in the receiving mode, evaluate the identification code stored in the time message, the code indicating whether the time stored in the transmitted time message has been adjusted.

6. The network user station of claim 4, wherein the further means, in the receiving mode, evaluate the identification code stored in the time message, the code indicating whether the time stored in the transmitted time message has been adjusted.

7. The network user station of claim 5, wherein the further means, in the receiving mode, do not further process a non-adjusted time of the time message.

8. The network user station of claim 6, wherein the further means, in the receiving mode, do not further process a non-adjusted time of the time message.

9. A network user station configured to connect to other network user stations through a network, said network user station comprising:

a transmitter for transmitting message strings containing messages to other network user stations, and a receiver for receiving message strings containing messages from other network user stations, wherein said transmitter further comprises a timer, a timing adjusting circuit and a network controller, wherein the message strings include time messages; and wherein, in a transmitting mode of the network user station, said timing adjusting circuit records a first delay time from said timer between an instant when a time message is input in the message string and an instant when transmission of the time message begins, and which adjusts the time of the time message corresponding to the recorded first delay time.

10. The network user station of claim 9, wherein said receiver further comprises:

a receiving timer, a received time adjusting circuit and a receiving network controller, and wherein said received time adjusting circuit records a receiver delay time from said receiving timer between an instant when the time message is received and an instant when the time message is processed, and which adjusts the time of the second time message corresponding to the recorded receiver delay time.

11. A synchronization method, comprising:

ascertaining a synchronization time for transmission in a time message;

calculating a delay time in accordance with a transmission queue position of the time message in a message string awaiting transmission; and adjusting the synchronization time in the time message by the delay time prior to the transmission.

12. The synchronization method according to claim 11, further comprising:

transmitting the time message to a remote station;

at the remote station, upon receiving the time message, calculating a further delay time in accordance with a processing queue position of the time message in the message string; and further adjusting the synchronization time in the time message by the further delay time.

\* \* \* \* \*